US007341259B1

(12) United States Patent
Slabich et al.

(10) Patent No.: US 7,341,259 B1
(45) Date of Patent: Mar. 11, 2008

(54) AIR SEAL SYSTEM FOR LOUDSPEAKER

(75) Inventors: John Slabich, Valencia, CA (US); Johnny Lo, Granada Hills, CA (US)

(73) Assignee: Harman International Industries, Incorporated

( * ) Notice: Subject to any disclaimer, the term of this patent is extended or adjusted under 35 U.S.C. 154(b) by 0 days.

(21) Appl. No.: 10/091,909

(22) Filed: Mar. 5, 2002

(51) Int. Cl.
*F16J 3/00* (2006.01)

(52) U.S. Cl. ...................... 277/628; 277/637; 277/641; 181/199; 381/386

(58) Field of Classification Search ................ 277/628, 277/637, 640, 641, 906; 24/122.6, 136 L, 24/115 M, 129 W; 181/199, 156; 381/386, 381/308; 312/296
See application file for complete search history.

(56) References Cited

U.S. PATENT DOCUMENTS

| | | | | | |
|---|---|---|---|---|---|
| 1,630,675 | A * | 5/1927 | Sinclair | 220/378 |
| 1,653,884 | A * | 12/1927 | Straub | 220/327 |
| 1,816,301 | A * | 7/1931 | Sundell | 24/339 |
| 2,805,729 | A * | 9/1957 | Read | 181/156 |
| 3,491,825 | A * | 1/1970 | Matson et al. | 164/228 |
| 3,892,289 | A * | 7/1975 | Rollins | 181/171 |
| 4,298,204 | A * | 11/1981 | Jinkins | 277/641 |
| 4,617,775 | A * | 10/1986 | Padrun | 52/684 |
| 4,773,502 | A * | 9/1988 | Adair | 181/149 |
| 4,825,015 | A * | 4/1989 | Prott et al. | 174/35 GC |
| 4,841,102 | A * | 6/1989 | Elsner et al. | 174/35 GC |
| 5,016,559 | A * | 5/1991 | Larson et al. | 116/234 |
| 5,331,725 | A * | 7/1994 | Chou | 24/545 |
| 5,351,371 | A * | 10/1994 | DeVeau et al. | 24/561 |
| 5,731,554 | A * | 3/1998 | Anagnos | 181/199 |
| 5,791,022 | A * | 8/1998 | Bohman | 24/130 |
| 5,964,465 | A * | 10/1999 | Mills et al. | 277/316 |
| 6,190,751 | B1 * | 2/2001 | Sylvester | 428/66.4 |
| 6,308,960 | B1 * | 10/2001 | Peale | 277/631 |
| 6,403,878 | B1 * | 6/2002 | Neuwardt et al. | 174/35 GC |
| 6,465,731 | B1 * | 10/2002 | Miska | 174/35 GC |
| 6,653,556 | B2 * | 11/2003 | Kim | 174/35 GC |
| 7,032,708 | B2 * | 4/2006 | Popken et al. | 181/150 |
| 2003/0190051 | A1 * | 10/2003 | Williamson | 381/398 |

* cited by examiner

*Primary Examiner*—William L. Miller
(74) *Attorney, Agent, or Firm*—The Eclipse Group LLP

(57) ABSTRACT

This invention provides an air seal system for loudspeakers where it is desirable to reproduce sound accurately and efficiently without loss in sound quality. The air seal system may include a housing, a baffle, and a cord gasket positioned in a gland to form an airtight seal between the baffle board and the housing. The gland may include a break. Secured in the break may be the cord gasket ends. The cord gasket ends also may be secured in a pocket, one or more notches, or in a retaining region.

28 Claims, 6 Drawing Sheets

AIR SEAL SYSTEM FOR LOUDSPEAKER

BACKGROUND OF THE INVENTION

1. Technical Field

This invention relates to seals for loudspeakers, more particularly, to a system for securing the ends of a loudspeaker cord gasket.

2. Related Art

Typically, loudspeakers have a voice coil/diaphragm assembly attached to a baffle board. In turn, the baffle board and a housing are sealed together to form an enclosure containing a measure of air. The seal typically is sandwiched between the baffle board and the housing so that no air can escape from the sealed enclosure.

In operation, the voice coil moves the diaphragm back and forth to act on the air in front of the loudspeaker. The diaphragm compresses air in the enclosure when it moves in and rarefies (i.e., decompresses) air when it moves out. This creates pressure differences between the air inside the sealed enclosure and the air outside the sealed enclosure. The pressure differences act like a spring that keeps the diaphragm in the right position. As such, the diaphragm produces sound that is more precise when the seal is tighter.

An airtight seal between the baffle and the housing allows the diaphragm to covert the air in front of the speaker to audible sound efficiently. However, if the seal is not airtight, then the pressure differences will not be as great. As a result, the voice coil/diaphragm assembly may have to draw more power to reproduce audible sound accurately. Drawing more power increases the operating cost of the loudspeaker and/or leads to incompatibility with other audio components such as a power amplifier. Additionally, if the pressure differences are far from pressure differences in the loudspeaker design, some of the low-pitched sounds, such as the bass, may be lost. A listener may hear air leaks when playing music through a speaker that has a breach in the seal. Accordingly, there is a need for an airtight seal in a loudspeaker to reproduce sound accurately and efficiently without loss in sound quality.

Prior attempts to seal the baffle board and the housing have included the utilization of a flat foam gasket. However, the cutting process employed to manufacture the flat foam gasket undesirably created scrap pieces that resulted in waste and higher unit prices. These flat foam gaskets tore easily, were difficult to position due to their flexibility, and resulted in a large amount of inventory.

Another attempted solution involved the utilization of a liquid gasket material. Although the liquid gasket material did not result in scrap pieces, the liquid gaskets still resulted in handling problems and they were messy and inconsistent. Here, the utilization of a preprogrammed machine to apply the liquid gasket material seemed to overcome some of the handling problems. However, the initial machine cost for a robotic method was high and not practical for low volume, such as less than 100,000 unit, applications. Therefore, there is a need to provide a cost effective, airtight seal for a loudspeaker to reproduce sound accurately and efficiently without loss in sound quality.

SUMMARY

An air seal system positioned between a loudspeaker baffle and the housing is disclosed. The air seal system includes a cord gasket positioned in a gland of the baffle with the ends of the cord gasket passed through a break in the gland. The ends of the cord gasket may meet at the break and curve towards an interior of the baffle board without crossing one another. Alternatively, the ends of the cord gasket may meet at the break and overlap one another or may be secured in a pocket, one or more notches, or in a retaining region.

With the cord gasket ends secured through the break in the gland or in the pocket, a notch, or a retaining region, the baffle and the housing may be mated together minimizing the need for further handling of the flimsy cord gasket. This simplified process may decrease manufacturing time translating into a decrease in manufacturing costs.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis being placed instead upon illustrating the principles of the invention. In the figures, like reference numerals designate corresponding parts throughout the different views.

DETAILED DESCRIPTION

Figure 1:
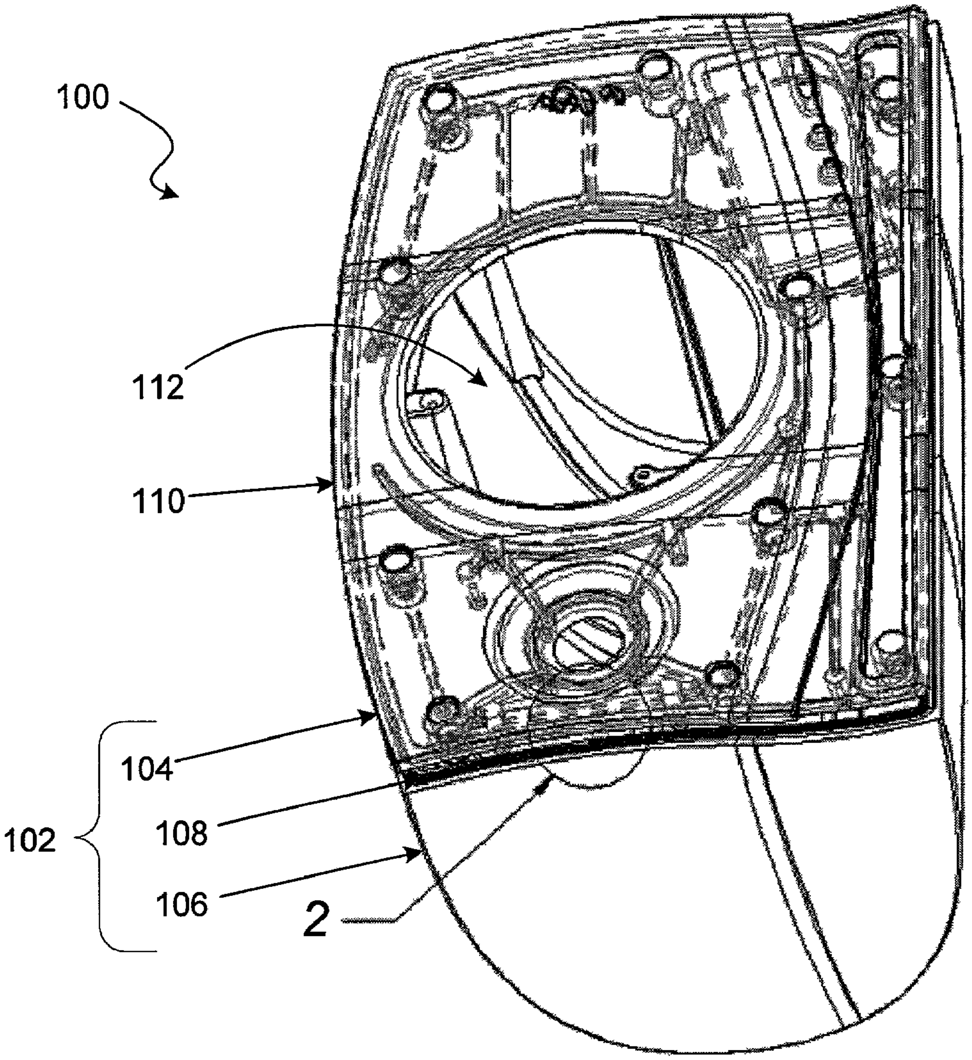
FIG. 1 is a perspective view illustrating an example implementation of an air seal system for a loudspeaker.

FIG. 1 is a perspective view illustrating a first air seal system for a loudspeaker. The loudspeaker 100 may include any components that support the conversion of electric signals into audible sound. Various embodiments of the loudspeaker 100 may include audio components such as a power amplifier and a voice coil attached to a diaphragm.

In one embodiment, the loudspeaker 100 may include an air seal system 102. The air seal system 102 may include a baffle 104, a housing 106, and a cord gasket 108. Assembling other components (not shown) with the air seal system 102 may form a sealed enclosure 110 containing an amount of air within an interior 112.

The baffle 104 may be a member capable of supporting other components such as transducers, tweeters, horns, ports and other components of a loudspeaker. The housing 106 may be any structure forming an outer shell protecting the operational components of the loudspeaker. Positioned between the baffle 104 and the housing 106 may be the cord gasket 108.

The cord gasket 108 may be fabricated of any material that contributes to forming a seal when compressed. The material may be a resilient rubber material, such as neoprene, nitrile, or butyl, and may include polytetrafluoroethylene. The cord gasket 108 may have a predetermined cross-section and length. The predetermined cross-section may include a circle, a diamond, a square, conic section or a combination or any or these cross-section shapes. In one embodiment, the cord gasket 108 may be cut from cord stock to a desired length. In another embodiment, an O-ring may be cut at one location to form the cord gasket 108.

Figure 2:
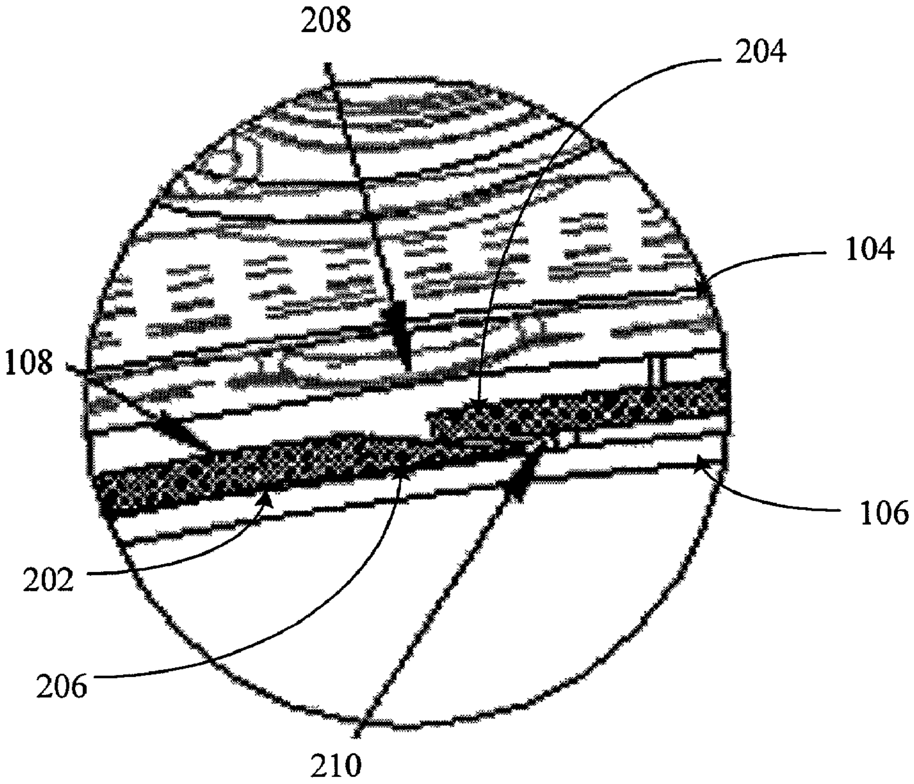
FIG. 2 is a detailed view of FIG. 1 taken generally within enclosed line 2 of FIG. 1.

FIG. 2 is a detailed view of FIG. 1 taken generally within enclosed line 2 of FIG. 1. As seen in FIG. 2, the cord gasket may be located in a gland 202. The gland 202 may be a long, narrow channel that follows a path about a perimeter that is common to both the baffle board 104 and the housing 106.

Processing of the cord gasket 108 may result in the cord gasket 108 defining a first end 204 and a second end 206. As an example implementation to secure the first end 204 and the second end 206 of the cord gasket 108, the air seal system 102 may utilize a male tongue 208 and a female groove 210. Positioning the female groove 210 to cooperate with the male tongue 208 secures the first end 204 and the second end 206.

The male tongue 208 and the female groove 210 may reside on different parts of the air seal system 102. The male tongue 208 may reside on the baffle board 104 and the female groove 210 may reside on the housing 106. In an alternate embodiment, the male tongue 208 may reside on the housing 106 and the female groove 210 may reside on the baffle board 104.

In operation, the cord gasket 108 may be placed and/or pressed into the gland 202 of the housing 106 so that the first end 204 and the second end 206 overlap at a position that is adjacent to the female groove 210. Placing the baffle board 104 against the housing 106, the male tongue 208 may function to compress the overlapping cord gasket 108 into the female groove 210 on the housing 106.

The air seal system 102 may provide an airtight seal such that sound may be reproduced while minimizing sound quality losses. However, the placement of the male tongue 208 and the female groove 210 on different parts of the air seal system 102 may sometimes cause difficulties during the loudspeaker assembly process of mating the baffle 104 to the housing 106. For example, dimension tolerances during manufacturing may vary such that the positional relationship between the male tongue 208 and the female groove 210 may be less than ideal. Additionally, an overlap distance (by which the first end 204 and the second end 206 overlap one another) may vary from unit to unit. As a result, these variations may increase the assembly time of aligning the overlapping ends 204, 206 between the male tongue 208 and the female groove 210. An increase in assembly time results in undesirable increase in overhead costs for the loudspeaker 100.

Figure 3:
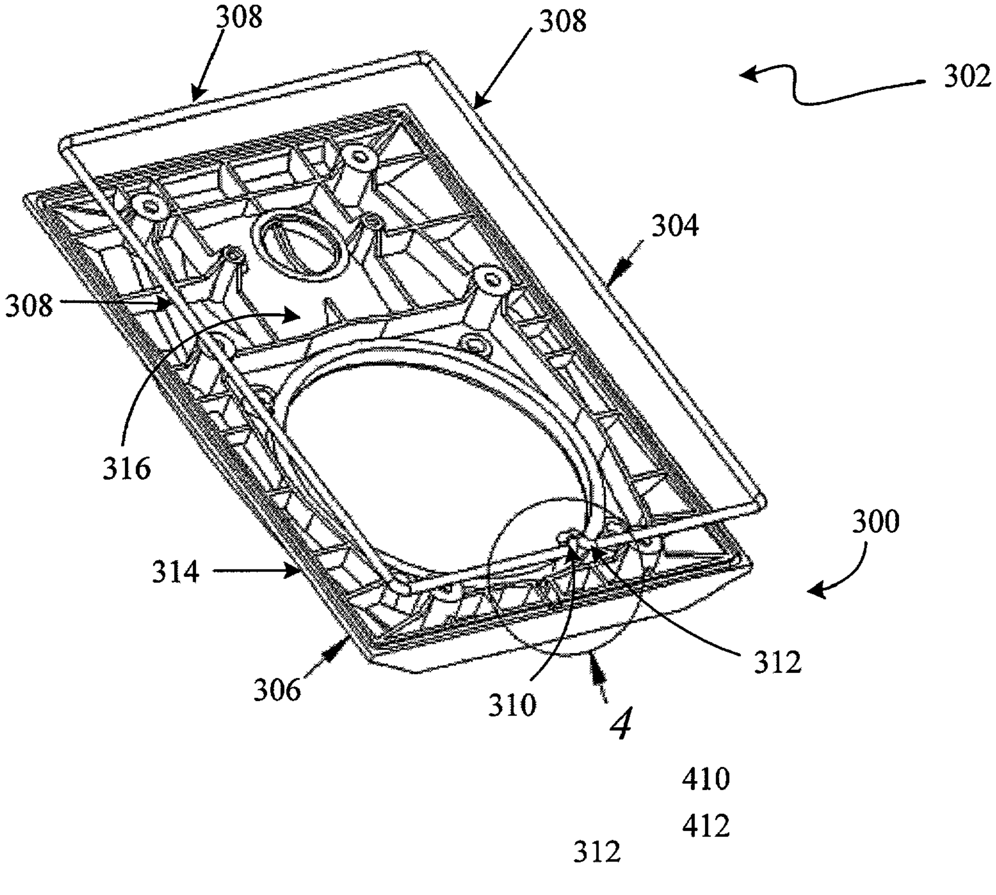
FIG. 3 is a perspective view illustrating a second example implementation of an air seal system for a loudspeaker.
Figure 5:
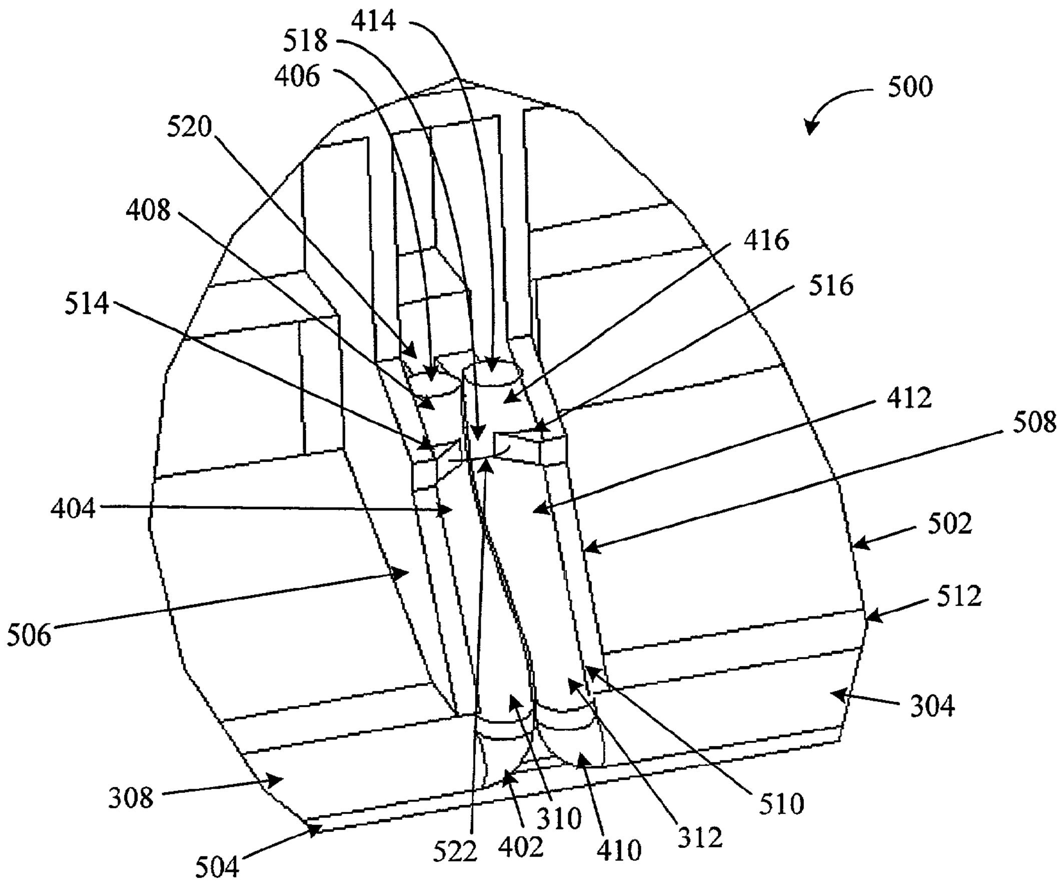
FIG. 5 is a perspective view illustrating a third example implementation of an air seal system for a loudspeaker.
Figure 6:
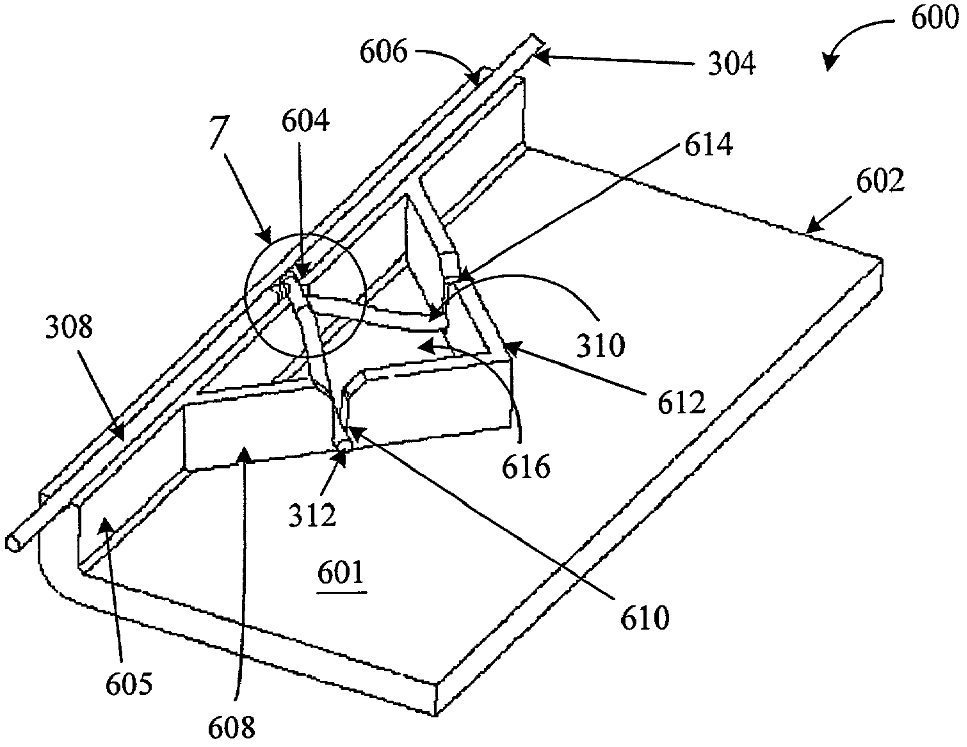
FIG. 6 is a perspective view illustrating a fourth example implementation of an air seal system for a loudspeaker.

As such, FIG. 3, FIG. 5, and FIG. 6 show three embodiments utilizing various embodiments of cord gasket end securing mechanisms. Placing the cord gasket end securing features on one part of an air seal system functions to decrease the time it takes to assemble a speaker housing and a baffle board together. A skilled person in the art may utilize one or more of these features in any embodiment without departing from the spirit of the invention.

FIG. 3 is a perspective view illustrating a second example implementation of an air seal system 300 for a loudspeaker 302, FIG. 1. The air seal system 300 may include a cord gasket 304, a baffle board 306, and a housing (not shown). The cord gasket 304 may include a segment 308 disposed between a first end 310 and a second end 312. The baffle board 306 may define a perimeter 314 having an interior 316.

Figure 4:
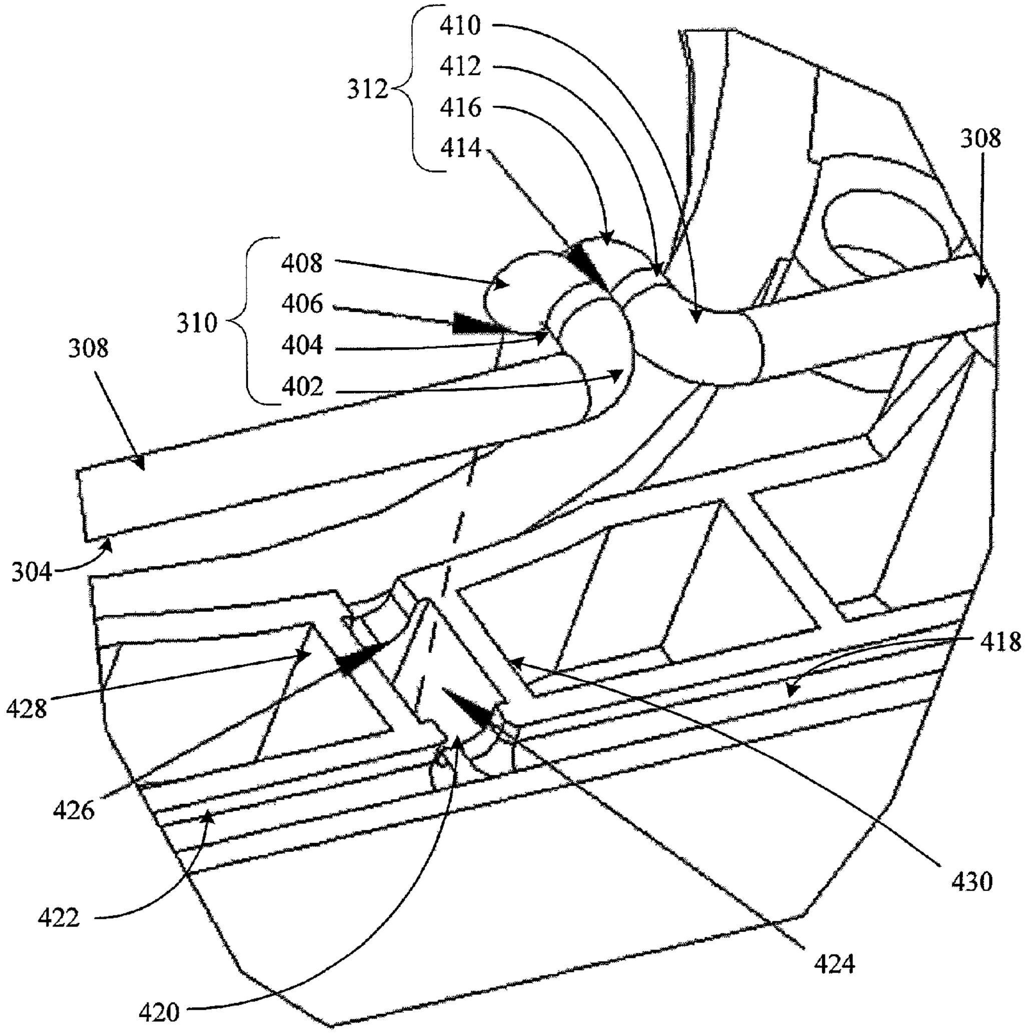
FIG. 4 is an exploded view of FIG. 3 taken generally within enclosed line 4 of FIG. 3.

FIG. 4 is an exploded view of FIG. 3 taken generally within enclosed line 4 of FIG. 3. In this embodiment, the first end 310 and the second end 312 meet and curve towards the interior 316, FIG. 3, of the baffle board 306 without crossing one another. The first end 310 may include a bend 402, FIG. 4, and a limb 404. The bend 402 may represent a change in direction of the cord gasket 304 between the segment 308 and the limb 404. The bend 402 may follow a curved path, an angled path, a sharp path, or any combination of these paths.

The limb 404 may extend from the bend 402 to a tip 406, where the tip 406 resides at a furthest most location along the cord gasket 304. In one embodiment, the limb 404 may include a head 408. The head 408 may represent a change in direction of the limb 404.

The second end 312 of the cord gasket 304 may have one or more features that are similar to the features of the first end 310. For example, the second end may include a bend 410 and a limb 412. The limb 412 may extend from the bend 410 to a tip 414, where the tip 414 may reside at a furthest most location along the cord gasket 304 from the tip 406. In one embodiment, the limb 412 may include a tail 416. The tail 416 may represent a change in direction of the limb 412.

To secure the ends 310, 312 of the cord gasket 304, the baffle board 306 may include a gland 418 and a passage 420. The gland 418 may extend around the perimeter 314, FIG. 3, of the baffle board 306 to provide an interference fit for the cord gasket 304. The passage 420, FIG. 4, may represent a break in an interior wall 422 of the gland 418 and may be configured to receive the cord gasket 304 such that the first end 310 and the second end 312 may be compressed into one another to provide a localized airtight seal.

The passage 420 may define any profile, including a rectangular profile, curved profile or a trapezoid profile. If the interior corners of the passage 420 are curved, the passage 420 may define a U-shape profile. Preferably, the width of the passage 420 may be less than two times the cross-sectional diameter of the cord gasket 304. The height of the passage 420 may be less than, equal to, or greater than the height of the gland 418.

Extra material at the ends 310, 312 of the cord gasket 306 may provide some flexibility when assembling the cord gasket 304 into the gland 418. To account for this extra material, the passage 420 may include a pocket 424 and/or a notch 426. The pocket 424 may define a cavity into which at least one of the head 408 and the tail 416 may be placed. The depth of the pocket 424 may be greater than the depth of the gland 418 to account for varying lengths of cord gasket. In one embodiment, the depth of the pocket 424 may be approximately 0.5 inch to 1.0 inch in depth. Alternatively, at least one of the limb 404 and the limb 412 may extend to and/or be press fit into the notch 426. In this example, the width of the notch 426 may be less than the combined cross-sectional diameter of the first end 310 and the second end 312.

As seen in FIG. 4, a first rib 428 and a second rib 430 may form the pocket 424. Under certain circumstances, the thickness of the baffle board may prevent the first rib 428 and the second rib 430 from forming a pocket. For example, sink marks are depressions that prevent the finish surface of an injection-molded part from being flat. Sink marks typically occur in a plastic injection molding process on the opposite side of a rib or other thick structure. As such, the thickness of the baffle board may at times prevent the utilization of ribs in the forming a pocket.

In response, FIG. 5 is a perspective view illustrating a third example implementation of an air seal system 500 for a loudspeaker (not shown). Similar to the embodiment of FIG. 3, the first end 310 and the second end 312 seen in FIG. 5 meet and curve towards the interior of a baffle board without crossing one another. However, the air seal system 500 may be employed in baffle boards that have thickness that might otherwise result in sink marks.

The air seal system may include the cord gasket 304 and a baffle board 502. The baffle board 502 may include a gland 504, a first wall 506, and a second wall 508. The first wall 506 and the second wall 508 may form a passage 510. The passage 510 may represent a break (i.e., opening) in an interior wall 512 of the gland 504. Placing and/or pressing the ends 310, 312 of the cord gasket 304 into the passage 510 of FIG. 5 may secure the ends 310, 312.

To further secure the ends 310, 312 of the cord gasket 304, the first wall 506 may include a tab 514 and the second wall 508 may include a tab 516. The tab 514 may extend as a protrusion from the first wall 506 towards the tab 516 to define a gap 518 and a retaining region 520. A distance of the gap 518 may be less than a cross-sectional diameter of the cord gasket 304 to prevent either end 310, 312 from falling outside of the retaining region 520. In an alternate embodiment, the tab 516 may be eliminated and the tab 514 may extend towards the second wall 508 to form the gap 518 with the second wall 508.

To provide quick insertion of the cord gasket 304 through the gap 518, the tab 514 and the tab 516 each may be chamfered (i.e., beveled or grooved) to define a V-shaped groove 522. The V-shaped groove 522 may define an angle that may range from approximately 25 degrees to 150 degrees. Additionally, the tab 514 and the tab 516 may flex when pressed from a first side and configured to remain rigid when pressed from a side facing the retaining region 520.

FIG. 6 is a perspective view illustrating a fourth example implementation of an air seal system 600 for a loudspeaker (not shown). Unlike the embodiments of FIG. 3 and FIG. 5, the first end 310 and the second end 312 may cross one another after meeting in the air seal system 600. As seen in FIG. 6, the first end 310 and the second end 312 may cross one another at an angle that is less than 180 degrees and extend towards an interior 601 of a baffle board 602. The air seal system 600 performs well even when the air pressure inside a speaker enclosure is low.

The air seal system 600 may include the cord gasket 304 and the baffle board 602. The baffle board 602 may include a passage 604 formed in an interior wall 605 of a gland 606. The passage 604 may include features that permit compressing an overlapping portion of the cord gasket 304 to substantially the same compression percentage as the segment 308.

As shown in FIG. 6, the baffle board 602 may further includes a first wall 608 having a first notch 610 and a second wall 612 having a second notch 614. The wall 608 and the wall 610 may meet to form a pocket 616. The first end 310 of the cord gasket 304 may be secured in the second notch 614. Moreover, the second end 312 of the cord gasket 304 may be secured in the first notch 610 at a location remote from the first end 310.

Figure 7:
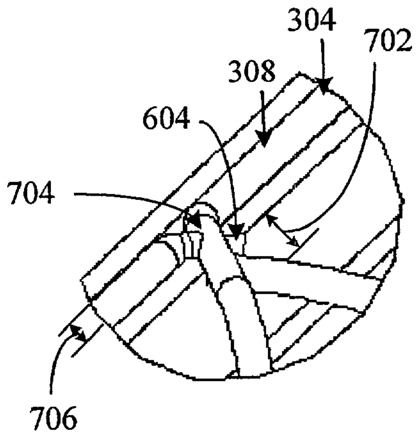
FIG. 7 is a detailed view of FIG. 6 taken generally within enclosed line 7 of FIG. 6.

FIG. 7 is a detailed view of FIG. 6 taken generally within enclosed line 7 of FIG. 6. In this embodiment, a depth 702 of the passage 604 may be large enough to permit compression of an overlapping portion 704 of the cord gasket 304 to substantially the same compression percentage as the segment 308. For example, if the cross-sectional diameter of the cord gasket 304 is 0.125 inches and it is desired to compress the cord gasket 304 by 25%, then a depth 706 of the gland 418 may be $\frac{3}{32}$ inches and the depth 702 of the passage 504 may extend $\frac{3}{32}$ inches to $\frac{1}{4}$ inches beyond the depth of the gland 418.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. An air seal system for a loudspeaker, comprising:

a baffle board having a passage coupled to a gland so as to form a break in the gland; and a cord gasket forming an air seal with the baffle board, the cord gasket comprising a first end, a second end, and a segment positioned between the first end and the second end, where the segment is positioned in the gland of the baffle board, and the first end and the second end are positioned in the passage.

2. The air seal system of claim 1, where the passage leads to a pocket having a depth and where at least one of the first end and the second end are positioned in the pocket.

3. The air seal system of claim 2, where the pocket depth is greater than a depth of the gland.

4. The air seal system of claim 3, where the depth of the pocket is approximately 0.5 inch to 1.0 inch.

5. The air seal system of claim 1, where the passage leads into a notch and where at least one of the first end and the second end are positioned in the notch.

6. The air seal system of claim 5, where the passage further leads to a pocket.

7. The air seal system of claim 6, where the second end of the cord gasket is positioned in the pocket.

8. The air seal system of claim 1, where the passage comprises a first wall having a first tab and a second wall comprising a second tab, where the first tab and second tab face one another to define a gap.

9. The air seal system of claim 8, where a distance of the gap is less than a distance of a cross-sectional diameter of the cord gasket.

10. The air seal system of claim 8, where a surface of the first tab and a surface of the second tab each are chamfered to define a V-shaped groove.

11. The air seal system of claim 10, where the V-shaped groove defines an angle that ranges from approximately 25 degrees to 150 degrees.

12. The air seal system of claim 8, where at least one of the first tab and the second tab is configured to flex when pressed from a first side and configured to remain rigid when pressed from a side generally opposite of the first side.

13. The air seal system on claim 1, where the first end and the second end are positioned in the passage to overlap one another and a depth of the passage is greater than a depth of the gland.

14. The air seal system of claim 1, where the first and second ends are compressed in the break.

15. An air seal system for a loudspeaker, the air seal system comprising;

a housing;

a baffle board; and means for creating an airtight seal between the baffle board and the housing, wherein the creating means includes a passage in the baffle board coupled to a gland to form a break in the gland.

16. The air seal system of claim 15, wherein the creating means further includes a cord gasket having a first end and a second end positioned in the passage.

17. The air seal system of claim 15, wherein the creating means includes a pocket in the baffle board having a depth and where at least one of a first end and a second end of a cord gasket are positioned in the pocket.

18. The air seal system of claim 17, wherein the pocket depth is greater than a depth of the gland.

19. The air seal system of claim 15, wherein the creating means includes at least one notch in the baffle board and where at least one of a first end and a second end of a cord gasket are positioned in the at least one notch.

20. The air seal system of claim 19, where the creating means includes a second notch in the baffle board positioned at a remote location from the at least one notch where the cord gasket has a first end secured in the at least one notch and a second end secured in the second notch.

21. The air seal system of claim 15, wherein the creating means includes a first wall in the baffle board having a first tab and a second wall in the baffle board having a second tab and where the first tab and the second tab face one another to define a gap.

22. The air seal system of claim 21, wherein a distance of the gap is less than a distance of a cross-sectional diameter of a cord casket located in the gap.

23. The air seal system of claim 15, wherein the creating means includes overlapping ends of a cord gasket within the passage, where a depth of the passage is greater than a depth of the gland.

24. An air seal system for a loudspeaker, comprising:

a baffle board having a passage coupled to a gland so as to form a break in the gland, the passage comprising a first wall having a first tab and a second wall comprising a second tab, the first tab and that second tab facing one another to define a gap, the first and second tabs comprising respective surfaces chamfered to define a V-shaped groove; and a cord gasket comprising a first end, a second end, and a segment positioned between the first end and the second end, where the segment is positioned in the gland of the baffle board, a first portion of the segment extends through the break into the passage and terminates at the first end, and a second portion of the segment extends through the break into the passage adjacent to the first end and terminates at the second end for forming a localized airtight seal.

25. The air seal system of claim 24, where a distance of the gap is less than a distance of a cross-sectional diameter of the cord gasket.

26. The air seal system of claim 24, where the V-shaped groove defines an angle that ranges from approximately 25 degrees to 150 degrees.

27. An air seal system for a loudspeaker, comprising:

a baffle board having a passage coupled to a gland so as to form a break in the gland, the passage comprising a first wall having a first tab and a second wall comprising a second tab, the first tab and the second tab facing one another to define a gap, where at least one of the first tab and the second tab is configured to flex when pressed from a first side and configured to remain rigid when pressed from a side generally opposite of the first side; and a cord gasket comprising a first end, a second end, and a segment positioned between the first end and the second end, where the segment is positioned in the gland of the baffle board, a first portion of the segment extends through the break into the passage and terminates at the first end, and a second portion of the segment extends through the break into the passage adjacent to the first end and terminates at the second end for forming a localized airtight seal.

28. The air seal system of claim 27, where a distance of the gap is less than a distance of a cross-sectional diameter of the cord gasket.

* * * * *